(12) United States Patent
Beaver

(10) Patent No.: US 11,258,902 B2
(45) Date of Patent: Feb. 22, 2022

(54) PARTIAL AUTOMATION OF TEXT CHAT CONVERSATIONS

(71) Applicant: Verint Americas Inc., Alpharetta, GA (US)

(72) Inventor: Ian Beaver, Spokane, WA (US)

(73) Assignee: VERINT AMERICAS INC., Alpharetta, GA (US)

( * ) Notice: Subject to any disclaimer, the term of this patent is extended or adjusted under 35 U.S.C. 154(b) by 183 days.

(21) Appl. No.: 16/581,898

(22) Filed: Sep. 25, 2019

(65) Prior Publication Data

US 2020/0106881 A1 Apr. 2, 2020

Related U.S. Application Data

(60) Provisional application No. 62/739,951, filed on Oct. 2, 2018, provisional application No. 62/748,638, filed on Oct. 22, 2018.

(51) Int. Cl.
| | |
|---|---|
| *H04M 3/51* | (2006.01) |
| *G06F 40/30* | (2020.01) |
| *H04L 12/58* | (2006.01) |
| *G06F 40/35* | (2020.01) |
| *G06F 16/332* | (2019.01) |
| *H04L 51/02* | (2022.01) |

(52) U.S. Cl.
CPC .......... *H04M 3/5166* (2013.01); *G06F 40/30* (2020.01); *H04L 51/02* (2013.01); *H04M 3/5183* (2013.01); *H04M 2203/404* (2013.01)

(58) Field of Classification Search
CPC ............. H04M 3/5166; H04M 3/5183; H04M 2203/404; H04L 51/02; G06F 40/30

USPC .......... 379/265.09, 265.05, 265.11, 265.12, 379/266.01, 266.02, 265.01
See application file for complete search history.

(56) References Cited

U.S. PATENT DOCUMENTS

| | | |
|---|---|---|
| 4,914,590 A | 4/1990 | Loatman et al. |
| 8,364,519 B1 | 1/2013 | Basu et al. |
| 2005/0141694 A1* | 6/2005 | Wengrovitz ........ H04M 3/5191 379/265.09 |
| 2011/0238410 A1 | 9/2011 | Larcheveque et al. |

(Continued)

FOREIGN PATENT DOCUMENTS

EP 2752797 7/2014

OTHER PUBLICATIONS

Search Report, dated Feb. 19, 2020, received in connection with corresponding EP Patent Application No. 19200841.5.

(Continued)

*Primary Examiner* — Thjuan K Addy
(74) *Attorney, Agent, or Firm* — Meunier Carlin & Curfman LLC

(57) ABSTRACT

To allow the human customer service agents to specialize in the instances where human service is preferred, but to scale to the volume of large call centers, systems and methods are provided in which human agents and intelligent virtual assistants (IVAs) co-handle a conversation with a customer. IVAs handle simple or moderate tasks, and human agents are used for those tasks that require or would benefit from human compassion or special handling. Instead of starting the conversation with an IVA and then escalating or passing control of the conversation to a human to complete, the IVAs and human agents work together on a conversation.

18 Claims, 6 Drawing Sheets

(56) References Cited

U.S. PATENT DOCUMENTS

| | | | |
|---|---|---|---|
| 2016/0099892 A1* | 4/2016 | Palakovich | H04L 51/02 709/206 |
| 2017/0324866 A1 | 11/2017 | Segre et al. | |
| 2018/0053119 A1 | 2/2018 | Zeng et al. | |
| 2018/0130463 A1 | 5/2018 | Jeon et al. | |
| 2019/0095425 A1* | 3/2019 | Galitsky | G06F 40/253 |

OTHER PUBLICATIONS

Alzona, R., "Call centers predicted to disappear in 10 years," Business Mirror, retrieved on Apr. 8, 2020 from http://www.businessmirror.com.ph/2016/05/07/call-centers-predicted-to-disappear-in-10-years, 2016, 2 pages.

Auxbreak Call Center Talk, "The call center industry may come to an end soon—according to some experts," retrieved on Apr. 8, 2020 from http://www.auxbreak.com/call-center-industry-may-come-to-an-end-soon, 2015, 3 pages.

Beaver, I., et al. "Detection of User Escalation in Human-Computer Interactions," Interspeech, 2016, 5 pages.

Caramenico, A., "Aetna improves virtual customer experience," FierceHealthPayer, retrieved on Apr. 8, 2020 from http://fiercehealthpayer.com/story/aetna-improves-virtual-costumer-experience/2013-11-05, 2013, 1 page.

Cifuentes, J., "Introducing the Bots Landscape: 170+ companies, $4 billion in funding, thousands of bots," retrieved on Apr. 7, 2020 from https://venturebeat.com/2016/08/11/introducing-the-bots-landscape-170-companies-4-billion-in-funding-thousands-of-bots, 2016, 9 pages.

Frearson, J., "From New York: How intelligent assistants are cutting customer waiting times," Business Reporter, retrieved on Apr. 8, 2020 from https://web.archive.org/web/20151203115539/http://business-reporter.co.uk/2015/10/15/from-new-york-how-intelligent-assistants-are-cutting-customer-waiting-times/, 2015, 2 pages.

Guynn, J., "Facebook Messenger takes another swipe at bots," retrieved on Apr. 8, 2020 from https://www.usatoday.com/story/tech/news/2017/04/18/facebook-messenger-takes-another-swipe-chat-bots/100596798/, 2017, 3 pages.

"Intelligent Virtual Assistant," Technopedia definition, retrieved on Apr. 7, 2020 from https://www.techopedia.com/definition/31383/intelligent-virtual-assistant, 2017, 2 pages.

Kuhn, R., et al., "The Application of Semantic Classification Trees to Natural Language Understanding," IEEE Transactions on Pattern Analysis and Machine Intelligence, vol. 17, No. 5, 1995, pp. 449-460.

Lison, P., "Structured Probabilistic Modelling for Dialogue Management," Ph.D. thesis, University of Oslo, 2014, 23 pages.

Marois, E., "Using Intelligent Virtual Agents to Improve the Customer Experience: Brains Before Beauty," ICMI Blog, retrieved on Apr. 7, 2020 from http://www.icmi.com/Resources/Self-Service/2013/11/Using-Intelligent-Virtual-Agents-to-Improve-the-Customer-Experience, 2013, 3 pages.

Mittal, V., et al., "Customer satisfaction: A strategic review and guidelines for managers," Marketing Science Institute, 2010, 27 pages.

Xu, H., et al., "LLT-PolyU: Identifying Sentiment Intensity in Ironic Tweets," Proceedings of the 9th International Workshop on Semantic Evaluation (SemEval 2015), Association for Computational Linguistics, 2015, pp. 673-678.

* cited by examiner

PARTIAL AUTOMATION OF TEXT CHAT CONVERSATIONS

CROSS-REFERENCE TO RELATED APPLICATIONS

This application claims the benefit of priority to U.S. Provisional Patent Application No. 62/739,951, filed on Oct. 2, 2018, entitled "Partial Automation of Text Chat Conversations," and the benefit of priority to U.S. Provisional Patent Application No. 62/748,638, filed on Oct. 22, 2018, entitled "Partial Automation of Text Chat Conversations with Active Learning," the contents of which are hereby incorporated by reference in their entireties.

BACKGROUND

An intelligent virtual assistant (IVA) is an engineered entity residing in software that interfaces with humans in a human way. IVA technology incorporates elements of interactive voice response (IVR) and other modern artificial intelligence (AI) features and aspects to deliver virtual identities that converse with users.

IVAs are commonly used for answering questions and task optimization. Many companies are deploying IVAs for efficient problem resolution and cost cutting in call centers and also as the first layer of technical and product support on websites. Many different software companies have created IVAs that reside on corporate web pages or otherwise are embedded in advertising and selling efforts. In these business domains, IVA accuracy and efficiency directly impacts customer experience and greatly reduces the company support costs.

IVAs are presently capable of replacing humans in customer service for common tasks. However, there still remains many instances where human users would prefer to have their task handled by a human. For example, when dealing with special cases or topics where sensitivity and compassion are required, such as the case in dealing with a deceased spouse's accounts or reporting improper employee conduct, human agents are much preferred.

In many instances, human agents already use canned or pre-populated responses when operating in live chat. They may simply click on a response or label and the pre-defined response text is displayed to the user on the other end of the chat. This still requires the human agent to read the customer's request and decide on the appropriate response however, and, therefore, takes time from more important interactions.

SUMMARY

To allow human customer service agents to specialize in the instances where human service is preferred, but to scale to the volume of large call centers, systems and methods are provided in which human agents and intelligent virtual assistants (IVAs) co-handle a conversation with a customer. IVAs handle simple or moderate tasks, and human agents are used for those tasks that require or would benefit from human compassion or special handling. Instead of starting the conversation with an IVA and then escalating or passing control of the conversation to a human to complete, the IVAs and human agents work together on a conversation.

In an implementation, a method for partially automating a text conversation between a user and a human agent comprises: opening a text conversation between a user computing device and an intelligent virtual assistant (IVA); determining an intent of the text conversation; and passing the text conversation to an agent computing device when the IVA recognizes the intent indicates to pass the text conversation to a human agent.

In an implementation, a method of training a language model in partial automation of text conversations comprises: collecting a plurality of input-response pairs from a plurality of intelligent virtual assistants (IVAs); clustering the input-response pairs into a plurality of clusters; selecting a cluster of the plurality of cluster that will provide a benefit; tagging a user intention of the input of the input-response pair of the selected cluster; and modifying the language model based on the tagged user intention.

In an implementation, a system for partially automating a text conversation between a user and a human agent comprises: an agent computing device with human agent text conversation capability and intelligent virtual assistant (IVA) text conversation ability, configured to maintain a text conversation between a user computing device and an IVA; and a natural language understanding (NLU) component configured to determine an intent of the text conversation and pass the text conversation to a human agent of the agent computing device when the IVA recognizes the intent indicates to pass the text conversation to the human agent.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
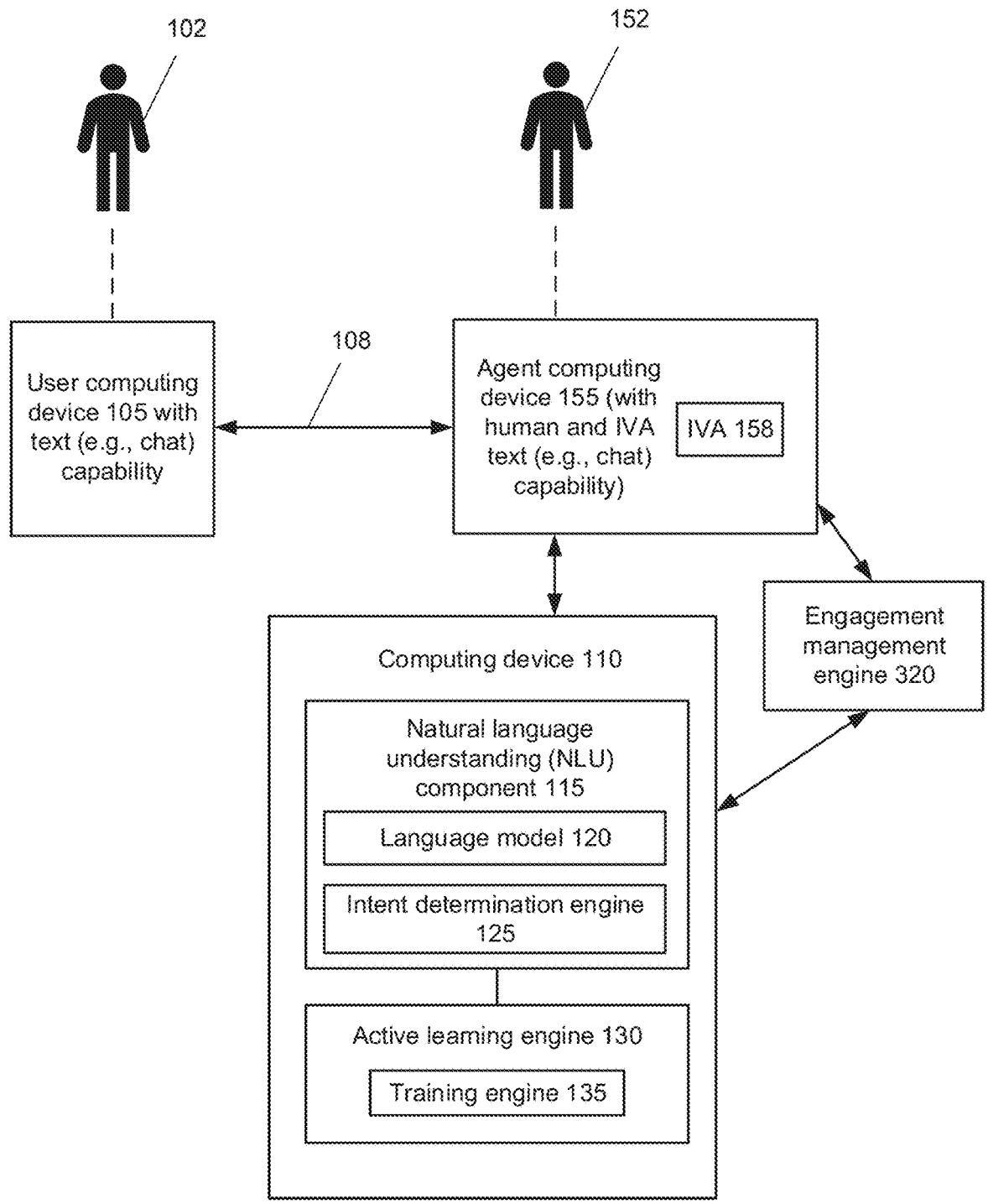
FIG. 1 is an illustration of an exemplary environment for partial automation of text chat conversations.

FIG. 1 is an illustration of an exemplary environment 100 for partial automation of text chat conversations. To allow the human customer service agents to specialize in the instances where human service is preferred, but to scale to the volume of large call centers, systems and methods are provided herein in which human agents and intelligent virtual assistants (IVAs) are able to co-handle a conversation with a customer (also referred to herein as a user). IVAs handle simple or moderate tasks, and human agents are used for those tasks that require or would benefit from human compassion or special handling. As described herein, instead of starting the conversation with an IVA and then escalating or passing control of the conversation to a human to complete, the IVAs and human agents work together on a conversation.

A user 102, using a user computing device 105 with text (e.g., chat) capability contacts an entity (such as a company call center) through a network 108. More particularly, the user 102 contacts an agent 152 (or representative, employee, associate, etc.) of a company using the user computing device 105 in communication with an agent computing device 155 via the network 108. The agent computing device 155 has text (e.g., chat) capability. Additionally or alternatively, the agent computing device 155 has virtual agent text (e.g., chat) capability, in particular an IVA 158.

A computing device 110 may be in communication with the agent computing device 155 to monitor the text in the call (i.e., the conversation) between the user computing device 105 and the agent computing device 155 (i.e., the text or chatting between the user 102, the agent 152, and the IVA 158). The computing device 110 may be implemented in, or embodied in, a desktop analytics product or in a speech analytics product, in some implementations.

The network 108 may be a variety of network types including the public switched telephone network (PSTN), a cellular telephone network, and a packet switched network (e.g., the Internet). Although only one user computing device 105, one agent computing device 155 with one IVA 158, and one computing device 110, are shown in FIG. 1, there is no limit to the number of computing devices 105, 155, 110 and IVAs 158 that may be supported.

Figure 6:
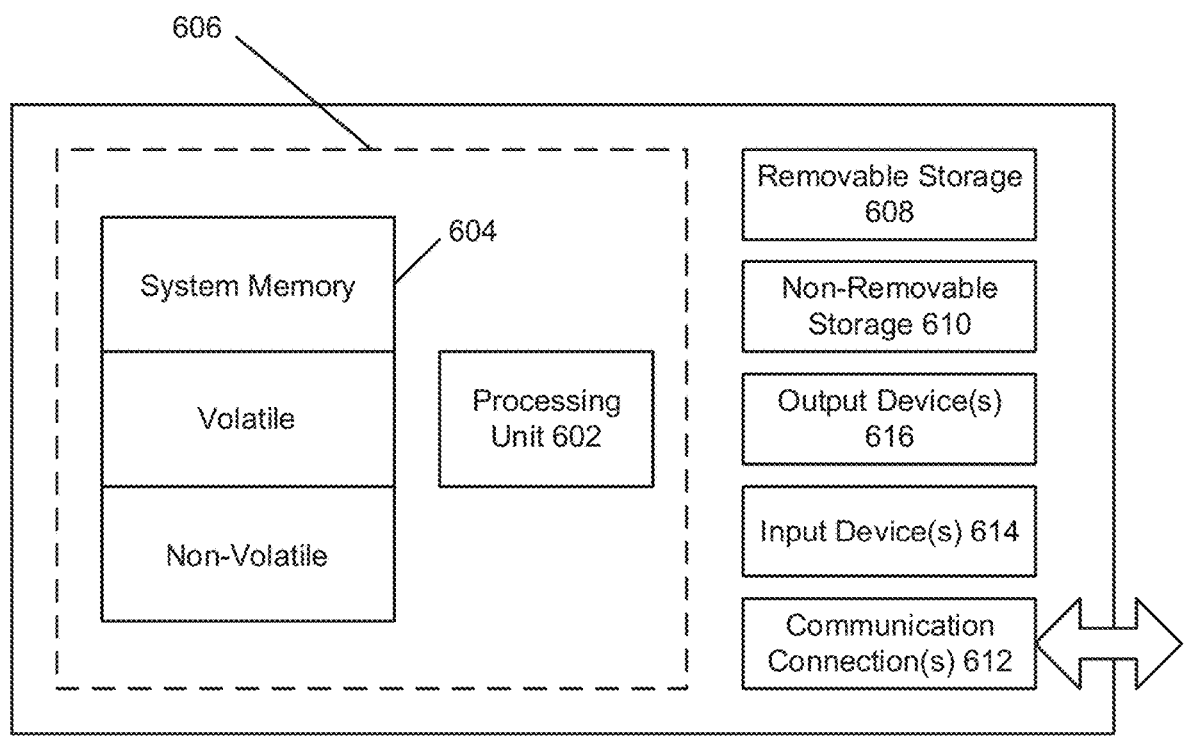
FIG. 6 shows an exemplary computing environment in which example embodiments and aspects may be implemented.

The user computing device 105, the agent computing device 155, and the computing device 110 may each be implemented using a variety of computing devices such as smartphones, desktop computers, laptop computers, tablets, set top boxes, vehicle navigation systems, and video game consoles. Other types of computing devices may be supported. A suitable computing device is illustrated in FIG. 6 as the computing device 600.

In some implementations, the computing device 110 comprises a natural language understanding (NLU) component 115, an active learning engine 130, and a training engine 135. The NLU component 115 may comprise a language model 120 and an intent determination engine 125. As described further herein, the computing device 110 and its various components and engines 115, 120, 125, 130, and 135 assist the agent 152 and the IVA 158 in providing better service and information to the user 102. The computing device 110 recognizes conditions based on the conversation between the user 102 and the agent 152, as well as the IVA 158, in different ways and contexts. More complex rules and actions may be implemented based on what the user 102 and/or the agent 152 and/or the IVA 158 are texting about and doing (e.g., actions they are taking) and based on the history of the chat and/or text conversation between the user 102, the agent 152, and the IVA 158.

The NLU component 115 comprises a language model 120. Depending on the implementation, the NLU component 115 may be comprised within the computing device 110, the agent computing device 155, or the IVA 158. In some implementations, the computing device 110 may be comprised within the agent computing device 155 (i.e., one or more of the various components and engines 115, 120, 125, 130, and/or 135 may be comprised within the agent computing device 155 or the IVA 158).

IVAs can be implemented in a multitude of ways, but common to all is a component for natural language understanding (NLU), which is used for the translation of user inputs into a semantic representation. Regardless of the means in which the user 102 is interacting with the IVA 158 (keyboard, speech, gestures, etc.), the user input is first converted into text or a numerical feature representation and fed into the NLU component 115 for analysis. The NLU component 115 maps user inputs, or conversational turns, to a derived semantic representation commonly known as the user intention or intent. The intent determination engine 125 determines the intent. In the context of natural language processing, intent is an interpretation of a statement or question that allows one to formulate the "best" response to the statement. Any type or implementation of a NLU component 115 may be used with the embodiments described or otherwise contemplated herein.

The collection of syntax, semantics, and grammar rules that define how input language maps to an intent within the NLU component 115 is referred to as a language model 120. The NLU component 115 may perform pre-processing steps such as text tagging, stemming, and entity identification (such as proper names or dates) before providing the text into the language model. Each of these parsers may be trained through machine learning methods or manually constructed by human experts.

When constructing the language model 120, intents are categorized into those that should be responded to by the IVA 158 and those that should be responded to by a human agent 152. The means to tag such intents varies depending on the construction of the language model 120, but an implementation consults an external table of response rules by intent before continuing with generating the response.

As described further herein, the active learning engine 130 and the training engine 135 are used in some implementations to update the language model 120 to increase the accuracy and efficiency of the NLU component 115.

The computing device 110 may incorporate desktop events at the agent computing device 155 for broader and richer interaction context between the user 102, the agent 152, and the IVA 158 (e.g., between the user computing device 105 and the agent computing device 155 including the IVA 158). The active learning engine 130 may drive notification and automation.

The computing device 110 recognizes and analyzes calls (e.g., chats and text conversations) in real-time, as a conversation between the user 102 and the agent 152 and/or the agent computing device 155 including the IVA 158 happens during a call. The computing device 110 monitors calls and activity in real-time, to detect predetermined words and phrases of interest as well as sentiment. This allows interactions between the user 102 and the agent 152 and the IVA 158 to be guided, resulting in better outcomes based on real-time analysis of call content and desktop activity. Automated interventions are provided, e.g., to agents via on-screen automated assistance, to managers via notifications and work-queue entries, and to analysts via reporting and post-call analytics.

In some implementations, the computing device 110 uses a real-time recorder that listens or monitors to interactions as they happen, and based on conversational indicators, identifies opportunities that can be used to guide or alter the interaction towards a better outcome for the mutual benefit of both the user 102 (i.e., the end customer) and the company or organization of the agent 152.

User input, such as text or chat data, from the user computing device 105 is provided to the NLU component 115. While conversational interaction may be encouraged by the agent computing device 155, the user input may also comprise inputs that are keyword searches or non-conversational. Depending on the implementation, the user input may be provided directly from the user computing device 105 (e.g., via the network 108) or from a chatbot implemented within or otherwise associated with the agent computing device 155 (e.g., via the network 108). The NLU component 115 processes the user input and outputs an output using an intent determined by the intent determination engine 125. The intent is the user intention which is then used to determine how to respond to that intention. In an implementation, the output may comprise the input's action, object, actor, indirect object, and/or their respective modifying details.

Figure 2:
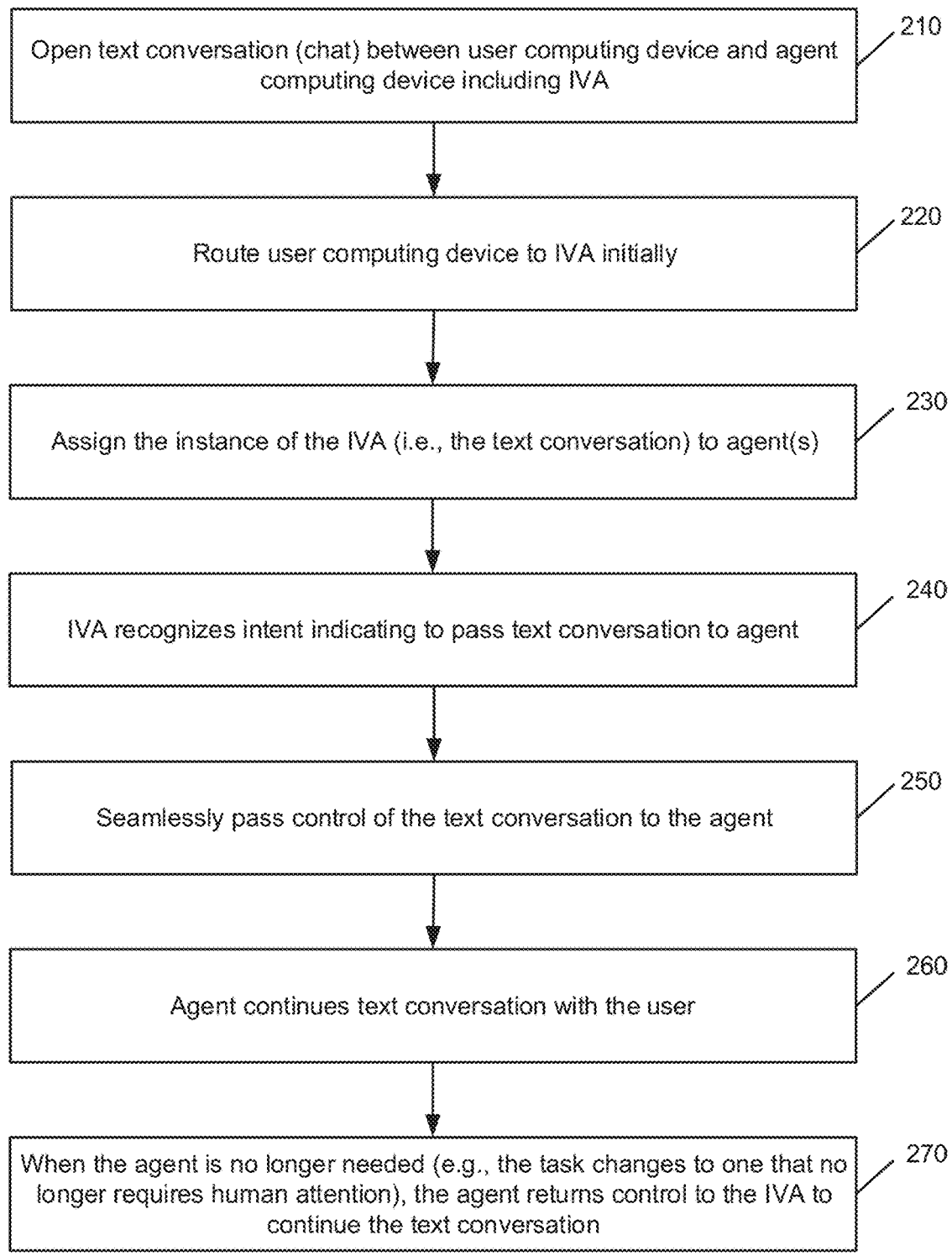
FIG. 2 is an operational flow of an implementation of a method for partial automation of text chat conversations.

FIG. 2 is an operational flow of an implementation of a method 200 for partial automation of text chat conversations. The method 200 may be implemented using the agent computing device 155 and the computing device 110, in some implementations.

At 210, a text conversation (also referred to as a text chat conversation or chat) is opened between the user computing device 105 and the agent computing device 155 including the IVA 158. In this manner, a user 102 and an agent 152 (e.g., a customer service representative) can communicate by text.

At 220, the user computing device 105 is initially routed to the IVA 158 which handles the greeting and initial user query. It is noted that the user computing device 105 (and hence the user 102) is unaware that it is communicating with the IVA 158 as opposed to a human agent (e.g., the agent 152).

At 230, the instance of the IVA 158 (i.e., the text conversation) is assigned to a particular human customer service representative or agent (such as the agent 152), or potentially a group of human agents.

At 240, the IVA 158 recognizes an intent which is indicated to pass the text conversation to the agent 155. Within the language model 120 used by the IVA 158 are particular intents that are to be handled by the human agent 152. For example, if the user 102 asks to file a complaint about a recent experience with the company, the concept of "complaint" would flag the text conversation to be continued by the human agent 152.

At 250, instead of responding to the user 102 with something like "I'm sorry to hear that, please wait while I transfer you to a human representative", the IVA 158 seamlessly passes control of the conversation over to its paired human agent 152 without indicating to the user 102 or the user computing device 105, or advising the user 102 or the user computing device 105, of this passing of control.

At 260, the human agent 152 then responds (using the agent computing device 155) directly to the user 102 (via the user computing device 105) as if the customer were texting or chatting to a single agent. In this manner, the agent 152 continues the text conversation with the user 102.

At 270, when the user 102 changes the task to one that no longer requires human attention, such as booking a flight, the human agent 152 returns control over to their IVA 158 to continue the text conversation seamlessly. To the user 102 (i.e., the human user), there is no indication that this change in control has occurred. By having the IVA 158 work alongside the human agent 152, that human agent 152 is able to handle a much larger volume of chats at once, and the agent's work may be relegated to the situations where human communication is superior to what an IVA can provide or otherwise desirable or preferred.

Figure 3:
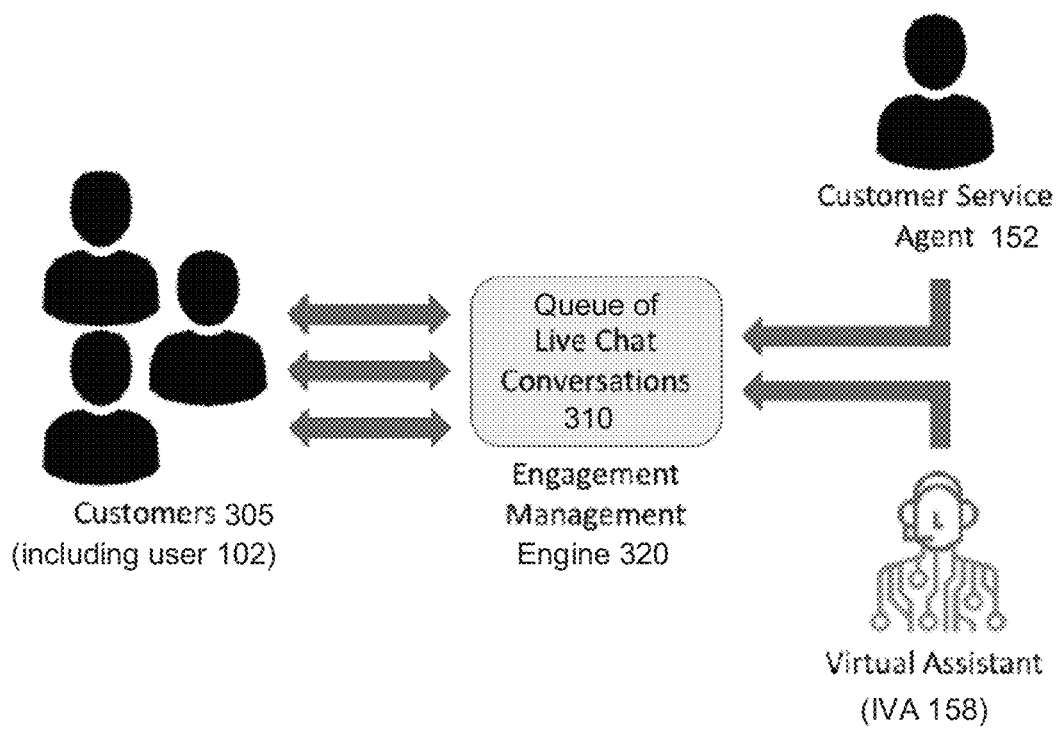
FIG. 3 is a diagram of the environment in which an agent shares a queue of live chat conversations (i.e., text conversations) with an intelligent virtual assistant (IVA)

FIG. 3 is a diagram of the environment 300 in which the agent 152 shares a queue of live chat conversations 310 (i.e., text conversations) with the IVA 158 using an engagement management engine 320. The queue of conversations 310 comprises a plurality of text conversations between a plurality of customers 305 (which may include the user 102) and the agent 152 and IVA 158. Each text conversation in the queue of conversations 310 may be processed as set forth above with respect to FIG. 2, for example. The engagement management engine 320 may be configured to switch the agent 152 and the IVA 158 among the various conversations in the queue of conversations 310 based on intent(s) and/or task(s) of each conversation, for example.

The engagement management engine 320 may be comprised within the computing device 110 in some implementations or the agent computing device 155 in other implementations. Alternatively, the engagement management engine 320 may be comprised within a separate computing device from the computing device 110 and the agent computing device 155.

Human-in-the-loop (HITL) is a subfield of machine learning where the language model requires some form of human interaction. A common HITL approach is known as active learning.

Figure 4:
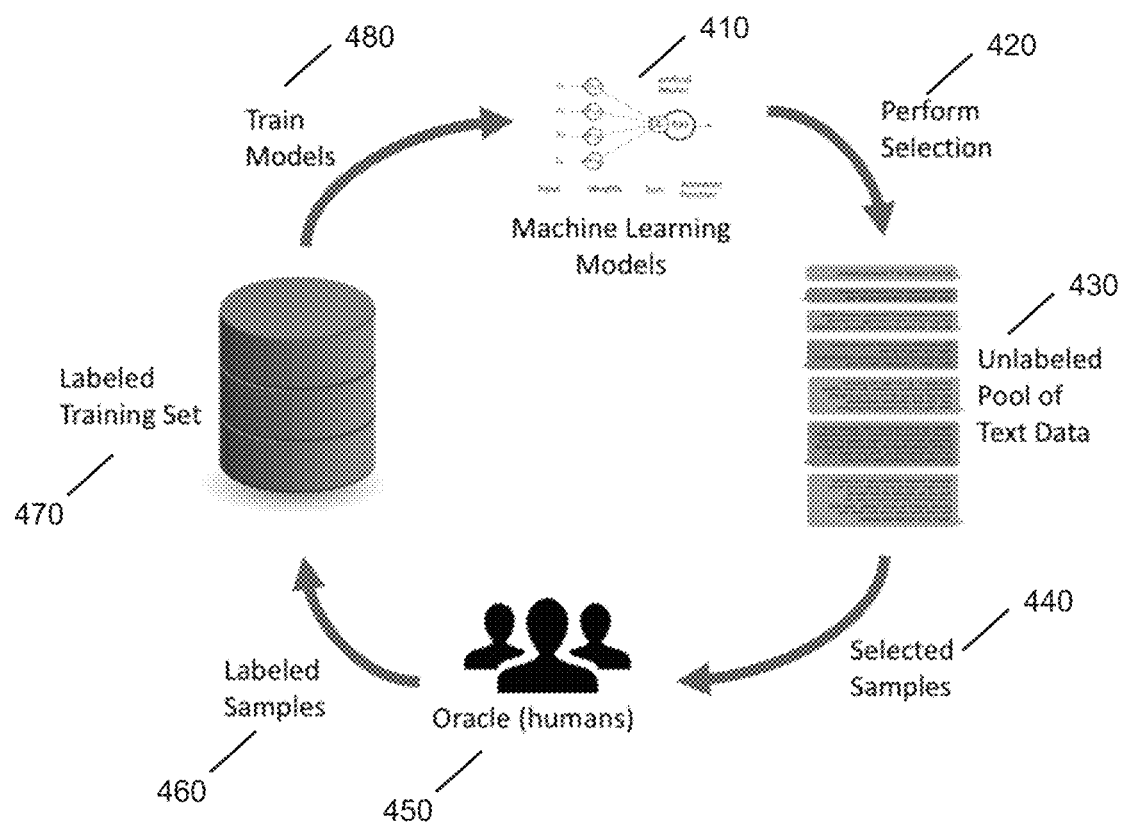
FIG. 4 is a diagram of an active learning cycle for a pool of text data useful for training a language model in partial automation of text chat conversations.

FIG. 4 is a diagram of an active learning cycle 400 for a pool of text data. With active learning, an existing language model 410 (shown in FIG. 4 as comprised with a group of machine learning models) performs selection 420 of samples from a large pool or stream of unlabeled samples 430.

The language model 410 chooses which samples from the unlabeled pool of text data 430 it thinks would be most informative to know the label for, based on a selection strategies, of which there are several commonly used. The selected samples 440 are provided to human oracles 450, who are then shown the selected samples 440 and give the selected samples 440 labels.

These labeled samples 460 are added to the labeled training set 470 (i.e., the training data) to train 480 the model 410. In this way, the model 410 will learn more quickly from less training data, than if given a large sample of labeled results that contain many duplicated features.

Additional abilities are provided for the IVA 158 to learn from interactions handled by the human customer service agent 152. As the engagement management engine 320 and/or the IVA 158 is monitoring the queue of live chats (e.g., queue of conversations 310 of FIG. 3), the IVA 158 attempts to answer any of the user requests that it can. In situations where the IVA 158 recognizes that it has not been trained on a topic, for example its intent confidence score is too low or the data or the interactive ability of the IVA 158 does not match any known intent pertaining to the user request, the IVA 158 will leave the question or request pertaining to that topic in the queue of conversations 310 for the human agent 152 to handle. When the human agent 152 does answer the user's question, the IVA 158 will save the user input and agent response together as training data. As some responses are very customized, containing billing values or account numbers for instance, it is not safe to assume that all input-response pairs are how the agent should learn.

Figure 5:
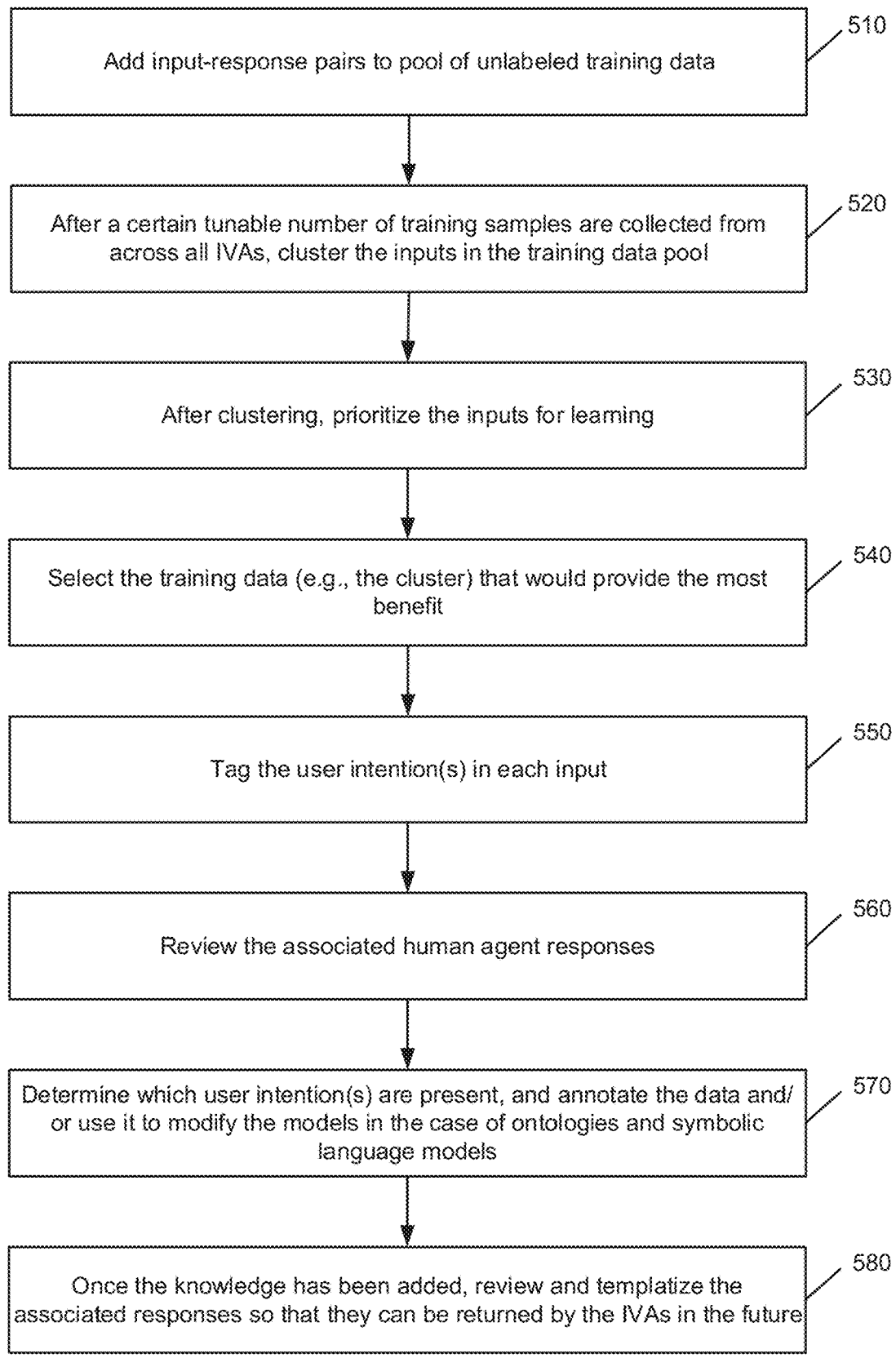
FIG. 5 is an operational flow of an implementation of a method of training a language model in partial automation of text chat conversations.

FIG. 5 is an operational flow of an implementation of a method 500 of training a language model in partial automation of text chat conversations. The method may be performed by the computing device 110, including the active learning engine 130 comprising the training engine 135. At 510, the input-response pairs are added to a pool of unlabeled training data (e.g., the unlabeled pool of text data 430 of FIG. 4) as training samples. In an implementation, the IVAs 158 in the contact center that are assigned to individual customer service agents 152 or groups of customer service agents 152 contribute training samples to the same pool as they are all working in the same language domain.

After a certain tunable number of training samples are collected from across all IVAs, at 520, the inputs in the training data pool are clustered, leveraging what the IVAs already know about the language domain. For example, the ontology or language model may be used to look for known words in the inputs, and these known words may then be tagged with additional metadata such as ontology class or topics.

After clustering, at 530, the inputs are prioritized for learning. This can be done several ways, and an implementation prioritizes them by size where the largest cluster should be learned first as it has the potential to reduce the workload of the human agents the most. Other examples and implementations of prioritization strategies may be by most unknown terms to the IVAs or by those containing the highest valued terms from the IVA's existing ontology.

This process follows the active learning paradigm by the learner selecting the training data (e.g., the cluster) that it would benefit the most from. As it is retrained, the language models and ontologies contain the new data and are used in determining what to learn next.

Once a cluster is selected to learn from, at 540, there are two things that have to happen. The user intention(s) in each input are tagged at 550, and the associated human agent responses are reviewed at 560. For the tagging, the set of inputs in the highest priority cluster is given to the domain experts that maintain the language models and data models deployed to the IVAs. Using these inputs, at 570, the domain experts (e.g., the human oracles 450) can determine which user intention(s) are present, and annotate the data and/or use it to modify the models directly in the case of ontologies and symbolic language models.

Once the knowledge has been added, at 580, the associated responses are reviewed and templatized so that they can be returned by the IVAs 158. For each of the inputs that have been added to the language model, the response returned by the live agent 152 is added to the natural language generation (NLG) model using the intentions that were labeled by the domain experts (e.g., the human oracles 450). The new responses are then compared to reduce duplication. In many contact centers, live human agents use software connected to knowledge bases of responses. The human agents are simply clicking on the pre-generated responses and they are pasted into the live chat window. Only when customer specific information such as information about a specific bill or service are used are the responses typed by the agents.

Therefore, these responses will be identical for many different user inputs and can be safely added to the NLG model without human review.

In cases where only one example response was given or the responses differ for the same user intention, a human, such as an agent, oracle, or administrator, reviews the response to create a template that can be rendered using customer specific fields. An example template may look like:

EXAMPLE 1

The amount of your last bill was {{last bill balance}}. Can I help you with anything else?

When rendering such templates during runtime, the IVA will replace the text in the brackets with context data from the live chat session. Template generation can be partially automated in situations where response text only differs in specific locations. For example, if two live responses were "The amount of your last bill was $25.14" and "The amount of your last bill was $62.11", the system could generate a template automatically like "The amount of your last bill was {{CURRENCY}}" and humans would specify the variable name where the currency originates from at run time.

Once improved, the updated NLU and NLG models can be deployed to all IVAs in the contact center. Through this process, the system can learn more quickly from actual live chats and partially automate the learning process to speed the retraining cycle.

FIG. 6 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 904 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by the device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communication connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a method for partially automating a text conversation between a user and a human agent is provided. The method includes opening a text conversation between a user computing device and an intelligent virtual assistant (IVA); determining an intent of the text conversation; and passing the text conversation to an agent computing device when the IVA recognizes the intent indicates to pass the text conversation to a human agent.

Implementations may include some or all of the following features. Passing the text conversation to the agent computing device is performed seamlessly without an indication to the user computing device or to the user. The method further comprises the agent computing device passing the text conversation back to the IVA pursuant to receiving an instruction from the human agent. Passing the text conversation back to the IVA is performed seamlessly without an indication to the user computing device or to the user. The method further comprises assigning an instance of the IVA to the human agent. The method further comprises assigning an instance of the IVA to a plurality of human agents. The method further comprises monitoring the intent of the text conversation and seamlessly passing the text conversation to the IVA or to the human agent of the agent computing device depending on the intent. The monitoring is performed continuously during the text conversation. The method further comprises selecting the text conversation from a queue of live chat conversations.

In an implementation, a method of training a language model in partial automation of text conversations is provided. The method includes collecting a plurality of input-response pairs from a plurality of intelligent virtual assistants (IVAs); clustering the input-response pairs into a plurality of clusters; selecting a cluster of the plurality of cluster that will provide a benefit; tagging a user intention of the input of the input-response pair of the selected cluster; and modifying the language model based on the tagged user intention.

Implementations may include some or all of the following features. The method further comprises prioritizing the inputs of the input-response pairs for learning. The method further comprises determining at least one present user intention based on the tagged user intention, wherein modifying the language model based on the tagged user intention comprises modifying the language model using the at least one present user intention. The method further comprises templatizing a response based on the modified language model. The IVAs are each assigned to one of a single human agent or a group of human agents.

In an implementation, a system for partially automating a text conversation between a user and a human agent is provided. The system includes an agent computing device with human agent text conversation capability and intelligent virtual assistant (IVA) text conversation ability, configured to maintain a text conversation between a user computing device and an IVA; and a natural language understanding (NLU) component configured to determine an intent of the text conversation and pass the text conversation to a human agent of the agent computing device when the IVA recognizes the intent indicates to pass the text conversation to the human agent.

Implementations may include some or all of the following features. The NLU component is further configured to pass the text conversation from the IVA to the human agent of the agent computing device to the agent computing device seamlessly without an indication to the user computing device or to the user. The NLU component is further configured to continuously monitor the intent of the text conversation and seamlessly pass the text conversation to the IVA or to the human agent of the agent computing device depending on the intent. The system further comprises an engagement management module configured to assign an instance of the IVA to the human agent or the a group of human agents, and to select the text conversation from a queue of live chat conversations. The system further comprises an active learning engine configured to update a language model and to increase the accuracy and efficiency of the NLU component. The active learning engine is further configured to collect a plurality of input-response pairs from a plurality of IVAs; cluster the input-response pairs into a plurality of clusters; select a cluster of the plurality of cluster that will provide a benefit; tag a user intention of the input of the input-response pair of the selected cluster; and modify the language model based on the tagged user intention.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for partially automating a text conversation between a user and a human agent, the method comprising:
   opening a text conversation between a user computing device of a user and an intelligent virtual assistant (IVA);
   determining an intent of the text conversation from a plurality of intents, wherein the intent is a derived semantic representation of language of the text conversation,
   categorizing in a language model the plurality of intents into intents to be responded to by the IVA and intents to be responded to by a human agent; and
   passing the text conversation to an agent computing device of the human agent when the IVA recognizes the intent indicates to pass the text conversation to a human agent, without providing an indication to the user computing device that the text conversation is passed to the agent computing device.

2. The method of claim 1, further comprising the agent computing device passing the text conversation back to the IVA pursuant to receiving an instruction from the human agent.

3. The method of claim 1, wherein passing the text conversation back to the IVA is performed seamlessly without an indication to the user computing device or to the user.

4. The method of claim 1, further comprising assigning an instance of the IVA to the human agent.

5. The method of claim 1, further comprising assigning an instance of the IVA to a plurality of human agents.

6. The method of claim 1, further comprising monitoring the intent of the text conversation and seamlessly passing the text conversation to the IVA or to the human agent of the agent computing device depending on the intent.

7. The method of claim 6, wherein the monitoring is performed continuously during the text conversation.

8. The method of claim 1, further comprising selecting the text conversation from a queue of live chat conversations.

9. A method of training a language model in partial automation of text conversations, the method comprising:
   collecting a plurality of input-response pairs from a plurality of intelligent virtual assistants (IVAs);
   clustering the input-response pairs into a plurality of clusters;
   selecting of from the plurality of clusters the largest cluster;
   tagging a user intention of the input of the input-response pair of the selected cluster, wherein the user intention is an intent which is a derived semantic representation of language of the text conversation;
   categorizing in a language model the plurality of intents into intents to be responded to by the IVA and intents to be responded to by a human agent; and
   modifying the language model based on the tagged user intention, wherein the language model comprises a collection of syntax, semantics, and grammar rules that define how input language maps to the user intention.

10. The method of claim 9, further comprising prioritizing the inputs of the input-response pairs for learning.

11. The method of claim 9, further comprising determining at least one present user intention based on the tagged user intention, wherein modifying the language model based on the tagged user intention comprises modifying the language model using the at least one present user intention.

12. The method of claim 9, further comprising templatizing a response based on the modified language model.

13. The method of claim 9, wherein the IVAs are each assigned to one of a single human agent or a group of human agents.

14. A system for partially automating a text conversation between a user and a human agent, the system comprising:
   an agent computing device with human agent text conversation capability and intelligent virtual assistant (IVA) text conversation ability, configured to maintain a text conversation between a user computing device and an IVA; and
   a natural language understanding (NLU) component configured to determine an intent of the text conversation from a plurality of intents, wherein the user intention is an intent which is a derived semantic representation of language of the text conversation, and to categorize in a language model the plurality of intents into intents to be responded to by the IVA and intents to be responded to by a human agent, and pass the text conversation to a human agent of the agent computing device when the IVA recognizes the intent indicates to pass the text conversation to the human agent, without providing an indication to the user computing device that the text conversation is passed to the agent computing device.

15. The system of claim 14, wherein the NLU component is further configured to continuously monitor the intent of the text conversation and seamlessly pass the text conversation to the IVA or to the human agent of the agent computing device depending on the intent.

16. The system of claim 14, further comprising an engagement management module configured to assign an instance of the IVA to the human agent or the a group of human agents, and to select the text conversation from a queue of live chat conversations.

17. The system of claim 14, further comprising an active learning engine configured to update a language model and to increase the accuracy and efficiency of the NLU component.

18. The system of claim 17, wherein the active learning engine is further configured to:
   collect a plurality of input-response pairs from a plurality of IVAs;
   cluster the input-response pairs into a plurality of clusters;
   select from the plurality of clusters the largest cluster;
   tag a user intention of the input of the input-response pair of the selected cluster; and
   modify the language model based on the tagged user intention.

* * * * *